June 12, 1962     S. R. SPORN ET AL     3,038,451
POSITION CONTROL SYSTEM
Filed Oct. 23, 1956

INVENTORS.
STANLEY R. SPORN
ROBERT E. MAYER
BY Raymond A. Paquin
ATTORNEY.

3,038,451
POSITION CONTROL SYSTEM
Stanley R. Sporn, Rego Park, and Robert E. Mayer, Glen Cove, N.Y., assignors to American Bosch Arma Corporation, a corporation of New York
Filed Oct. 23, 1956, Ser. No. 617,792
7 Claims. (Cl. 121—41)

The present invention relates to servo systems and has particular reference to means for reducing the disturbing effects of adverse transfer functions, such as fixed time delay or compliance, on the stability of closed loop systems.

In a feedback control device, each of the elements may have an effect on the stability of the device. In a hydraulic control system, for example, the compliance in the oil lines, reacting with the load mass or inertia, and oil leakage produces a resonance effect. The result of this resonance effect may be instability in the control device if the gain of the controller is too high. In practice, if a large inertia is controlled, the resonance in the hydraulic lines may seriously limit the performance which can be attained. The same effect will be found in other control systems in which a phase lag exists between the actual output shaft position and the controller output order.

In a feedback device containing a compliant member between the controller output and the controller shaft, the instability due to the compliance may be eliminated by modifying the controller input signal so as to cancel therefrom the high frequency component of the actual output position and replacing the high frequency component with the high frequency changes in the position of the controller output.

For a more complete understanding of this invention, reference may be had to the accompanying diagram, in which, FIG. 1 shows a conventional feedback device including a compliant member;

Figure 1:
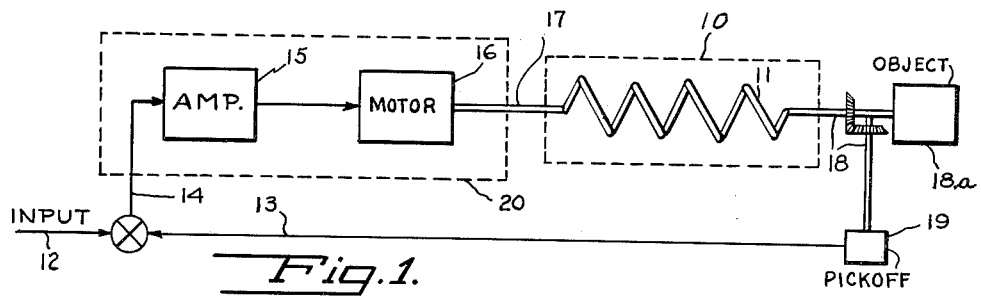

Referring now to FIG. 1, the compliant member or phase lag linkage 10 there shown is contemplated as comprising any physical structure in which a phase lag exists between the input order and output reaction of the linkage, such as may be exemplified by the mechanical spring 11. The system of FIG. 1 is conventional, in which a desired position input signal 12 and an actual position signal 13 are compared and the error signal 14 is applied through amplifier 15 to motor 16. The output shaft 17 of motor 16 drives one end of the compliant member 10, the other end of which is connected to drive the output shaft 18 which in turn drives the object 18a which may be a gun turret for example or some other high inertia load. The signal 13, proportional to the positional displacement of shaft 18, is produced in the pickoff device 19 which is operatively connected to shaft 18 and may be any well known device used for that purpose, such as a resistance potentiometer, for example.

It has been found that the phase-lag in the response of the compliant member tends to cause instability. In order to remove this cause of instability, the feedback loop is closed around the controller 20, which contains amplifier 15 and motor 16, instead of around the complete system for that range of frequencies in which the compliance adversely affects the system stability.

Figure 2:
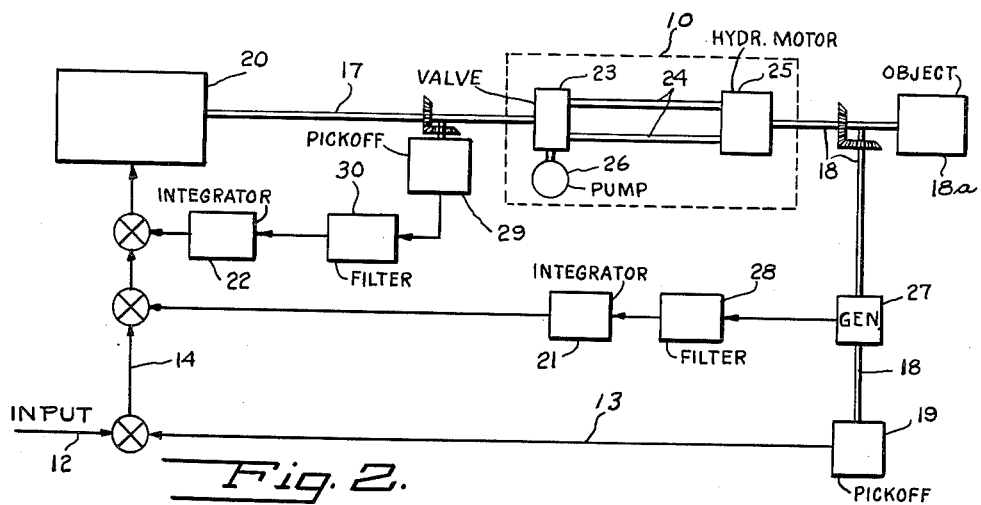
FIG. 2 illustrates a feedback compensating device in a particular hydraulic system.

To accomplish this change the circuit of FIG. 2, in which the reference numerals used in FIG. 1 refer to like objects, and which is directed particularly to hydraulic servo systems may be used. In this figure the error between the desired position signal 12 and the actual position signal 13 is applied to the controller 20 in series with the output signals of the integrators 21 and 22. The controller shaft 17 adjusts the position of a hydraulic valve 23, or the tilt plate of a hydraulic pump, for example, and thereby regulates the amount of oil flowing through the tubing 24 to the hydraulic motor 25. The pump 26 maintains the oil pressure. In this type of control, the speed at which shaft 18 is driven by the motor 25 is dependent on the position of shaft 17. The pickoff 19 being operatively connected to shaft 18, produces a signal proportional to the displacement of shaft 18 from a reference position. When the shaft 18 is displaced from the desired position the difference between the signal produced in the pickoff device 19 and the input signal at 12 is such that the controller 20 displaces shaft 17 so as to cause the hydraulic system to supply more or less oil, in the proper direction to cause the motor 25 to drive shaft 18 towards the desired position. When the actual position of shaft 18 agrees with the desired position, the error signal becomes zero and the controller 20 returns shaft 17 to the position where the speed of shaft 18 is reduced to zero.

The compliance in the hydraulic system which contains valve 23, tubing 24 and motor 25 produces a phase lag between the change in position of the controller shaft 17 and a corresponding change in the motion of shaft 18. The compliance therefore has a tendency to cause instability and oscillation of the output.

In order to eliminate this tendency to oscillate, the feedback loop between the output shaft 18 and control device 20 is opened for high frequencies and a feedback loop is closed between the output shaft 17 of the control device 20 and the input to the controller 20.

A tachometer generator 27 is driven by shaft 18 to produce an electrical signal proportional to the actual speed of shaft 18. Tachometer 27 may be a D.C. tachometer producing a pulsating output whose oscillations represent the oscillations in the speed of shaft 18, and whose average value represents the average speed of shaft 18. The output of the tachometer 27 is transmitted through a high pass filter 28, to remove the low frequency components and to pass only the signals representing the oscillation of shaft 18, and the output of the filter 28 is integrated with respect to time in the integrating device 21 which may be any type of conventional integrator. For example, the integrator 21 may be the simple well known resistance-capacitance integrator. The output of the integrator 21 is therefore a voltage proportional in amplitude to the high frequency variation in the position of shaft 18. The output of the integrator 21, properly scaled is connected in series with the positional error signal 14 in a manner such as to cancel the contribution of the high frequency components in the positional signal 13.

Also, the shaft 17, is connected to drive the movable member of pickoff device 29. The output of pickoff 29 is transmitted through the high pass filter 30 to remove the low frequency signals and is integrated with respect to time in the integrator 22. Since the position of shaft 17 corresponds to the theoretical velocity of shaft 18, it will be seen that the integrator 22 produces a signal proportional to the theoretical high frequency displacement of shaft 18. The output of integrator 22 is combined with the output of integrator 21 and the error signal 14 to produce a signal showing the error between the desired low frequency displacement of shaft 18 and its actual low frequency position and the error between the desired high frequency displacement of shaft 18 and the theoretical high frequency position.

Thus, for low frequency changes in desired position, the feedback loop is closed between the output shaft 18 and controller 20 while for high frequency changes the feedback loop is closed between the output of the controller 20 and its input. For high frequencies, therefore, the position of the output shaft 18 is affected only as an open loop element and does not contribute to instability of the system yet for low frequencies the system maintains positive control of the output position in a closed loop.

In a system without the compensating feedback, the hydraulic compliance normally has an undesirable effect on stability only at high frequencies. By proper adjustment of the high pass filter networks in the feedback channels the feedback may be made to become effective at an optimum frequency so as to remove the effect of the compliance where its frequency response characteristics are becoming undesirable. The system is made to operate at low frequencies as though the feedback signal from the compensating device were not present by suitably adjusting the low frequency cutoff characteristics of the high pass filters.

The usual results are that a higher system gain and closed loop frequency response bandwidth can be achieved.

Figures 3, 4:
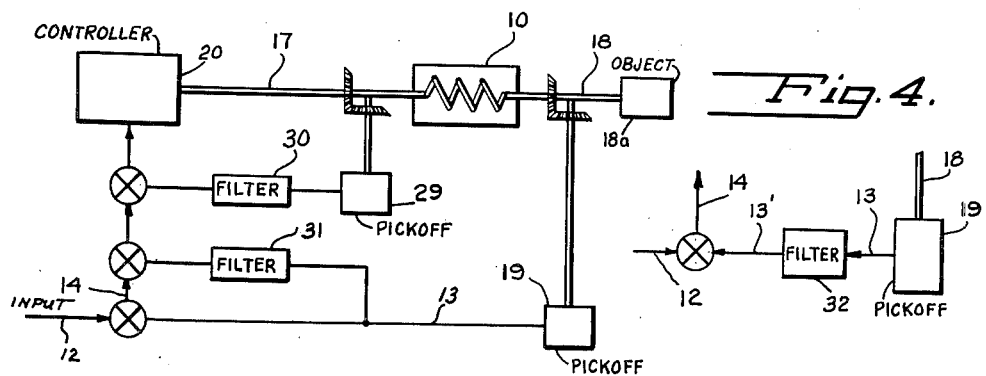
FIG. 3 is a modification of FIG. 2.
FIG. 4 shows a modification of a part of FIG. 3.

FIG. 3 illustrates the invention as applied to a device in which the position of shaft 17 controls the position of shaft 18 through a compliant member 10 such as a spring, for example. In this case the integrators 21, 22 may be omitted since velocity control is not employed, and the output of the high pass filter 30 can be connected directly to the error signal circuit. The output 13 of pickoff 19 is connected through high pass filter 31 to the error signal 14 to remove the high frequency variations of the actual position of shaft 18 from the error signal 14. Alternatively, a low pass filter 32 may be used as shown in FIG. 4 where the output of the pickoff 19 is transmitted through the filter 32, and the output 13' of the filter 32 is compared with the desired signal 12 to produce the error signal 14.

The various connections of FIGS. 2, 3 and 4 between the output of the complaint member 10 and the input to the controller 20 all serve the same function, which is to remove from the input to the controller 20 all the high frequency variations in the position of shaft 18 although different means are employed. The invention is not intended to be limited by these illustrated connections, however, since many others will occur to those skilled in the art.

We claim:

1. In a position control system, a controlled shaft, controller means having an output, means connecting said output of said controller means and said controlled shaft, means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

2. In a position control system, a controlled shaft, controller means having an output, means connecting said output of said controller means and said controlled shaft, pickoff means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

3. In a position control system, a controlled shaft, controller means having an output, means connecting said output of said controller means and said controlled shaft for regulating the speed of said controlled shaft, means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

4. In a position control system, a controlled shaft, controller means having an output, means connecting said output of said controller means and said controlled shaft for regulating the speed of said controlled shaft, pickoff means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

5. In a position control system, a controlled shaft, controller means having an output, means connecting said output of said controller means and said controlled shaft for regulating the position of said controlled shaft, means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

6. In a position control system, a controlled shaft, controller means having an output, means connecting said output of said controller means and said controlled shaft for regulating the position of said controlled shaft, pickoff means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

7. In a position control system, a controlled shaft, controller means having an output, means connecting said output of said controller means and said controlled shaft, said means operatively connecting said output of said controller means and said controlled shaft including a member having an adverse transfer function, means for measuring the actual displacement of said controlled shaft and producing a signal representative thereof, signal means representing a given desired displacement of said controlled shaft, means for determining the difference between the signals representing said actual and said desired displacement, means for separating the high frequency variations of the signals representing said actual displacement of said controlled shaft, means for removing said high frequency variations from said difference for modifying the same, means for obtaining a signal representative of the high frequency variations in said controller output, means for combining the output of said last named means and said modified difference to obtain an error signal, said error signal being connected to energize said controller means.

No references cited.